(12) United States Patent
Chiussi et al.

(10) Patent No.: US 10,303,802 B2
(45) Date of Patent: May 28, 2019

(54) SYSTEM FOR MOBILE APPLICATION SEARCH

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Newark, NJ (US)

( * ) Notice: Subject to any disclaimer, the term of this patent is extended or adjusted under 35 U.S.C. 154(b) by 372 days.

(21) Appl. No.: 13/965,115

(22) Filed: Aug. 12, 2013

(65) Prior Publication Data

US 2014/0279997 A1    Sep. 18, 2014

Related U.S. Application Data

(60) Provisional application No. 61/802,104, filed on Mar. 15, 2013.

(51) Int. Cl.
G06F 17/30    (2006.01)

(52) U.S. Cl.
CPC .. *G06F 17/30864* (2013.01); *G06F 17/30699* (2013.01)

(58) Field of Classification Search
None
See application file for complete search history.

(56) References Cited

U.S. PATENT DOCUMENTS

| 6,804,718 | B1 | 10/2004 | Pang et al. |
| 7,461,086 | B1 | 12/2008 | Hurren et al. |
| 7,984,060 | B2 | 7/2011 | Payton et al. |
| 8,170,536 | B2 | 5/2012 | Normark et al. |
| 2002/0033843 | A1 | 3/2002 | Loos et al. |
| 2002/0078253 | A1 | 6/2002 | Szondy et al. |
| 2006/0026335 | A1 | 2/2006 | Hodgson et al. |
| 2006/0236302 | A1 | 10/2006 | Bateman et al. |

(Continued)

OTHER PUBLICATIONS

ISR written opinion of the International searching authority for the corresponding PCT application 2014027076.

*Primary Examiner* — James Trujillo
*Assistant Examiner* — Cheryl M Shechtman
(74) *Attorney, Agent, or Firm* — Miles & Stockbridge PC (57) ABSTRACT

A Searchable Application Representation is generated with the exact structure, content, functionality, and behavior of the Native Mobile Applications and is searchable by Search Engines by providing metadata pointing to the Native Mobile Applications. The Search Engine searches the Searchable Application Representation. When the Search Engine finds the Searchable Application Representation, Pointer, Metadata and Search Material to Corresponding Native Mobile Application on the Internet, the Search Engine becomes aware of the Native Mobile Application and can search the Content contained in the Searchable Application Representation. The Search Engine finds and ranks Content in the Searchable Representation and Pointer, Metadata, and Search Material corresponding to such Content in the Native Mobile Application is passed to the Search Engine, which can use such information to determine the relevancy of such Content according to a certain Search Criteria.

12 Claims, 10 Drawing Sheets

(56) References Cited

U.S. PATENT DOCUMENTS

| | | |
|---|---|---|
| 2007/0150816 A1 | 6/2007 | Hariki |
| 2007/0157191 A1 | 7/2007 | Seeger et al. |
| 2008/0275844 A1* | 11/2008 | Buzsaki ............ G06F 17/30424 |
| | | 707/3 |
| 2009/0006388 A1* | 1/2009 | Ives .................. G06F 17/30675 |
| 2009/0006409 A1 | 1/2009 | Yang et al. |
| 2009/0063421 A1 | 3/2009 | Burson et al. |
| 2009/0183092 A1 | 7/2009 | Naghshineh |
| 2010/0005481 A1 | 1/2010 | Lewis et al. |
| 2010/0070496 A1 | 3/2010 | Ghosh |
| 2010/0124939 A1 | 5/2010 | Osborne et al. |
| 2010/0223115 A1* | 9/2010 | Chodosh ................ G06Q 30/02 |
| | | 705/14.12 |
| 2011/0016448 A1 | 1/2011 | Bauder et al. |
| 2011/0137935 A1 | 6/2011 | Bobick et al. |
| 2011/0154287 A1 | 6/2011 | Mukkamala et al. |
| 2011/0161912 A1 | 6/2011 | Eteminan et al. |
| 2011/0164056 A1 | 7/2011 | Ording et al. |
| 2011/0276608 A1 | 11/2011 | O'Farrell et al. |
| 2012/0109951 A1 | 5/2012 | Huynh et al. |
| 2012/0174079 A1 | 7/2012 | Luh |
| 2012/0191694 A1* | 7/2012 | Gardiol ............... G06F 17/2715 |
| | | 707/709 |
| 2012/0213103 A1 | 8/2012 | Cheng-Wei et al. |
| 2012/0226676 A1 | 9/2012 | Kasterstein et al. |
| 2012/0260232 A1 | 10/2012 | Hirsch et al. |
| 2012/0284247 A1* | 11/2012 | Jiang ................. G06F 17/30867 |
| | | 707/706 |
| 2012/0323965 A1 | 12/2012 | Carpenter et al. |
| 2013/0013671 A1 | 1/2013 | Relan et al. |
| 2013/0318064 A1* | 11/2013 | Atherton ........... G06F 17/30864 |
| | | 707/709 |
| 2013/0326333 A1* | 12/2013 | Hashmi ............... G06F 17/2247 |
| | | 715/234 |
| 2014/0201179 A1* | 7/2014 | Chang ............... G06F 17/30864 |
| | | 707/706 |

* cited by examiner

SYSTEM FOR MOBILE APPLICATION SEARCH

BACKGROUND OF THE INVENTION

Figure 1:
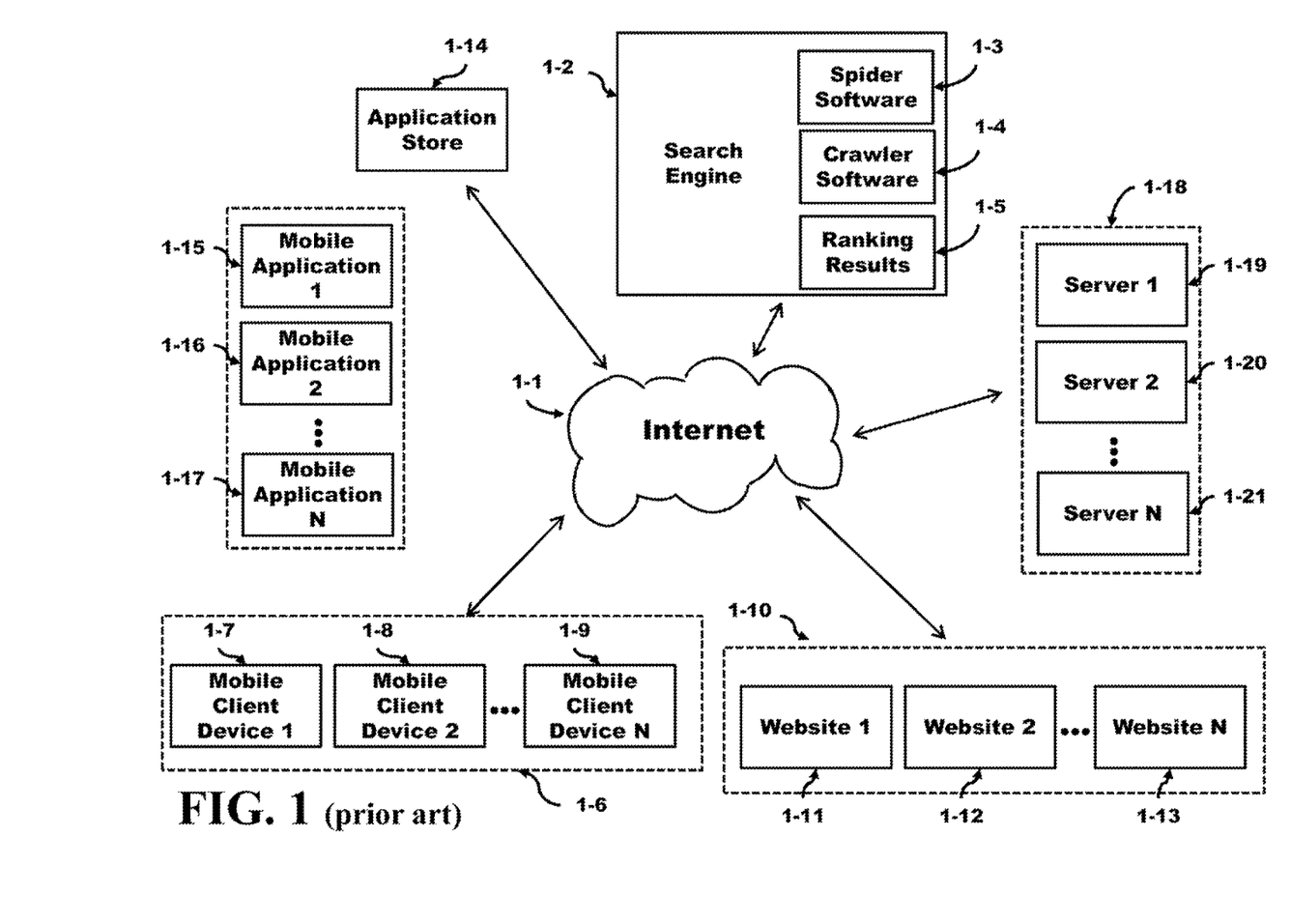
FIG. 1 depicts the Internet coupling a plurality of Mobile Client Devices comprising Mobile Client Devices including smartphones, cellphones, wearable devices, and tablets to a plurality of Websites and a plurality of Servers 1-18.

The Internet is a communication system that interconnects the world. The internet has been structured to provide connectivity to billions of users with laptops, notebooks, desktops, TV sets, cellular phones, smartphones, wearable devices and tablets. FIG. 1 shows the Internet 1-1 connecting a plurality of Mobile Client Devices 1-6 comprising Mobile Client Device 1 1-7, Mobile Client Device 2 1-8 to Mobile Client Device N 1-9. Mobile Client Devices include smartphones, cellphones, wearable devices, and tablets. The Internet also connects to a plurality of Websites 1-10 comprising Website 1 1-11, Website 2 1-12 to Website N 1-13, a plurality of Servers 1-18 comprising Server 1-19, Server 2 1-20 to Sever N 1-21. Also connected to the Internet is a Search Engine 1-2, which includes Spider Software 1-3 and Crawler Software 1-4 to search the plurality of Websites 1-10, find, such Websites and the Pages contained in them, and Ranking Result 1-5 software to "rank" the search result to allow an end user to search the Internet. Examples of Search Engines are Google and Bing. Also connected to the Internet is an Application Store 1-14, which contains a plurality of Mobile Applications comprising Mobile Applications 1 1-15, Mobile Application 2 1-16 to Mobile Application N 1-17. End users desiring one of such Mobile Applications, can connect their Mobile Client Device to the Application Store and download the desired Mobile Application onto their Mobile Client Device for their use. There is an Application Store for every mobile platform. Examples of Application Stores are the Apple Application Store serving Mobile Applications for iPhone and iPad, and the Android Market Application Store serving Mobile Applications for devices running the Android Operating System.

Figure 2:
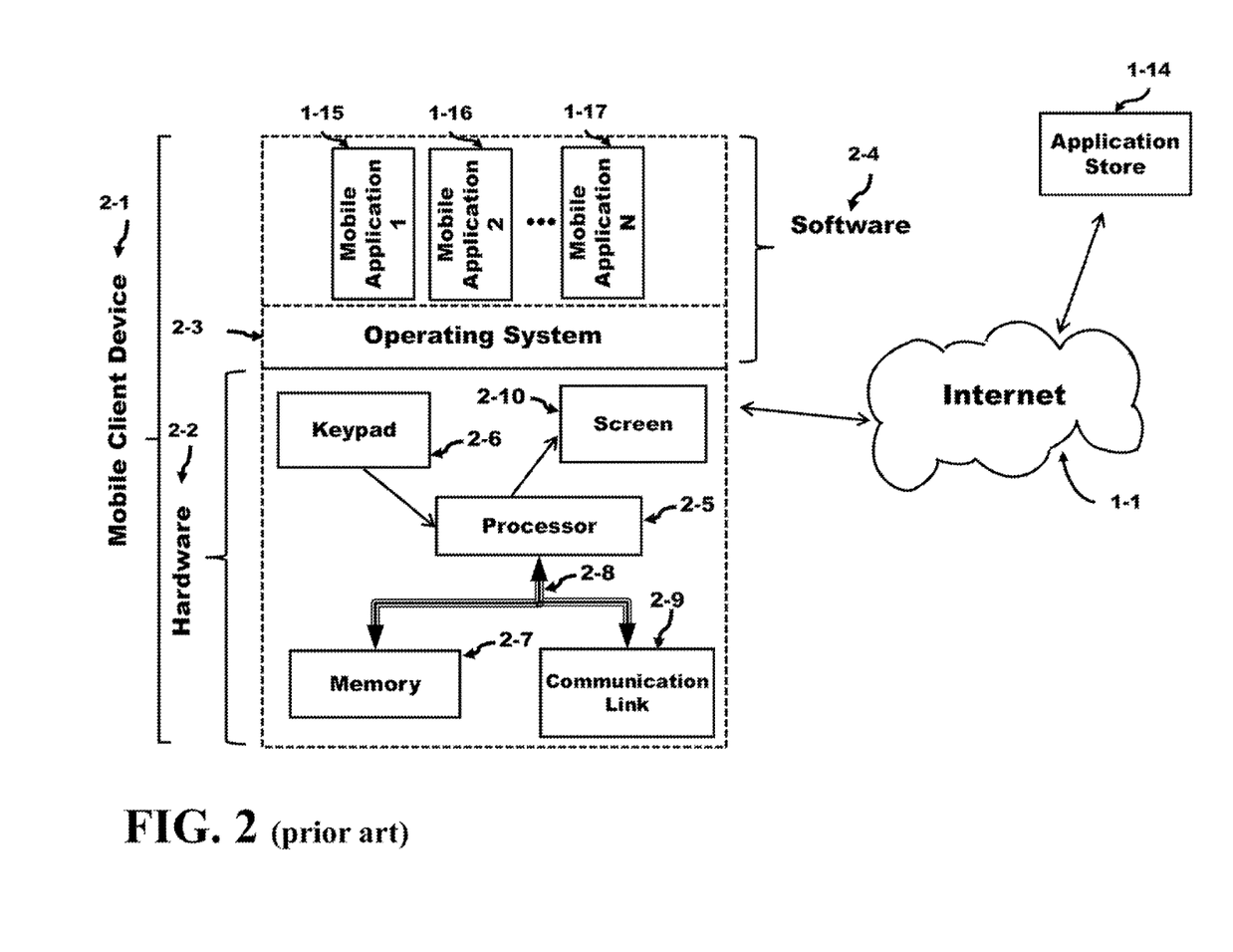
FIG. 2 shows that a Mobile Client Device which consists of a Hardware, comprising a Processor, a Memory, a Communication Link, a Screen, a Keypad, and other hardware components, and a Software, comprising an Operating System, and a plurality of Mobile Applications coupled to the Application store.

FIG. 2 shows that a Mobile Client Device 2-1 which consists of a Hardware 2-2, comprising a Processor 2-5, to Memory 2-7, a Communication Link 2-9, a Screen 2-10, a Keypad 2-6 and other hardware components (not shown), and a Software 2-4, comprising an Operating System 2-3, and a plurality of Mobile Applications comprising Mobile Application 1 1-15, Mobile Application 2 1-16, to Mobile Application N 1-17. The connection of the Mobile Client Device 2-1 to the Internet 1-1 is wireless, and can be cellular, WiFi, Bluetooth, WiMax, etc. The plurality of Mobile Applications can be downloaded to the Mobile Client Device 2-1 via the Internet 1-1 from the Application Store 1-14. When a Mobile Application in the plurality of Mobile Applications is downloaded to the Mobile Client Device, it runs on the Operating System 2-3 of the Mobile Client Device.

Figure 3A:
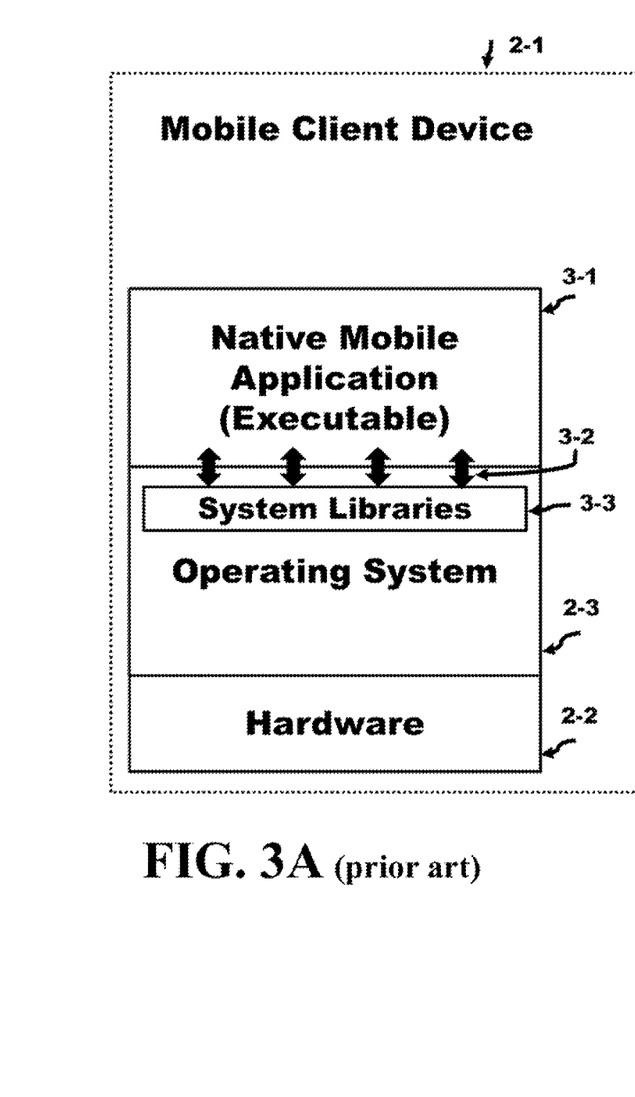
FIG. 3A and FIG. 3B present two different types of Mobile Application, shows a Native Mobile Application and how it relates to the layered stacks of the hardware/software representation of a Mobile Client Device.
Figure 3B:
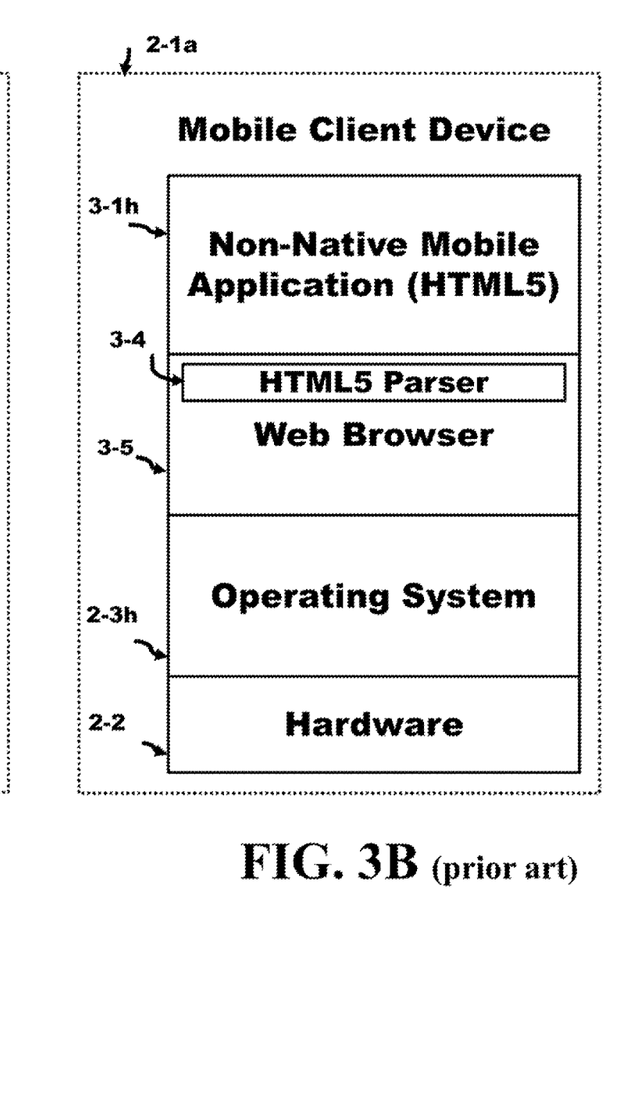

FIG. 3A and FIG. 3B present two different types of Mobile Application. FIG. 3A shows a Native Mobile Application and how it relates to the layered stacks of the hardware/software representation of a Mobile Client Device 2-1. The Native Mobile Application 3-1 is an executable which runs directly on the operating system 2-3 of the Mobile Client Device 2-1, which in turn runs on the hardware 2-2. The operating system 2-3 provides a set of system libraries 3-3, which the Native Mobile Application uses. The Native Mobile Application is compiled to run on the operating system of the client device. The Native Mobile Application needs to be downloaded to the client device and installed on the client device in order to run on the client device. The Native Mobile Application 3-1 executable is compiled specifically for the Operating System 2-3 on which it is running, and thus a first Mobile Client Device running a first Operating System would require a different executable to be downloaded for a second Mobile Client Device running a second Operating System. The Native Mobile Application 3-1 executable is downloaded from the Application Store 1-14.

FIG. 3B shows a Non-Native Mobile Application and how it relates to the layered stacks of the hardware/software representation of a Mobile Client Device 2-1a. The Non-Native Mobile Application 3-1h does not run directly on the operating system 2-3h of the client device, but instead uses a web browser 3-5 installed on the Mobile Client Device in order to run. The Non-Native Mobile Application 3-1h is written in a programming language that is understood by the web browser running on the Mobile Client Device. The most common example of such a language is HTML5. The web browser running on the Mobile Client Device contains an HTML5 Parser 3-4 that is used to interpret the code of the Non-Native Mobile Application 3-1h. The Non-Native Mobile Application 3-1h does not depend on the Mobile Client Device 2-1a since it does not run directly on the Operating System 2-3h but instead uses the web browser 3-5 running on the Mobile Client Device 2-1a. The Non-Native Mobile Application 3-1h can run on any Mobile Client Device 2-1a that runs a web browser 3-5 capable of understanding the language which the Non-Native Mobile Application is written in. The web browser 3-5 may depend on the Mobile Client Device 2-1a, but the Non-Native Mobile Application does not depend on the client device.

Figure 4:
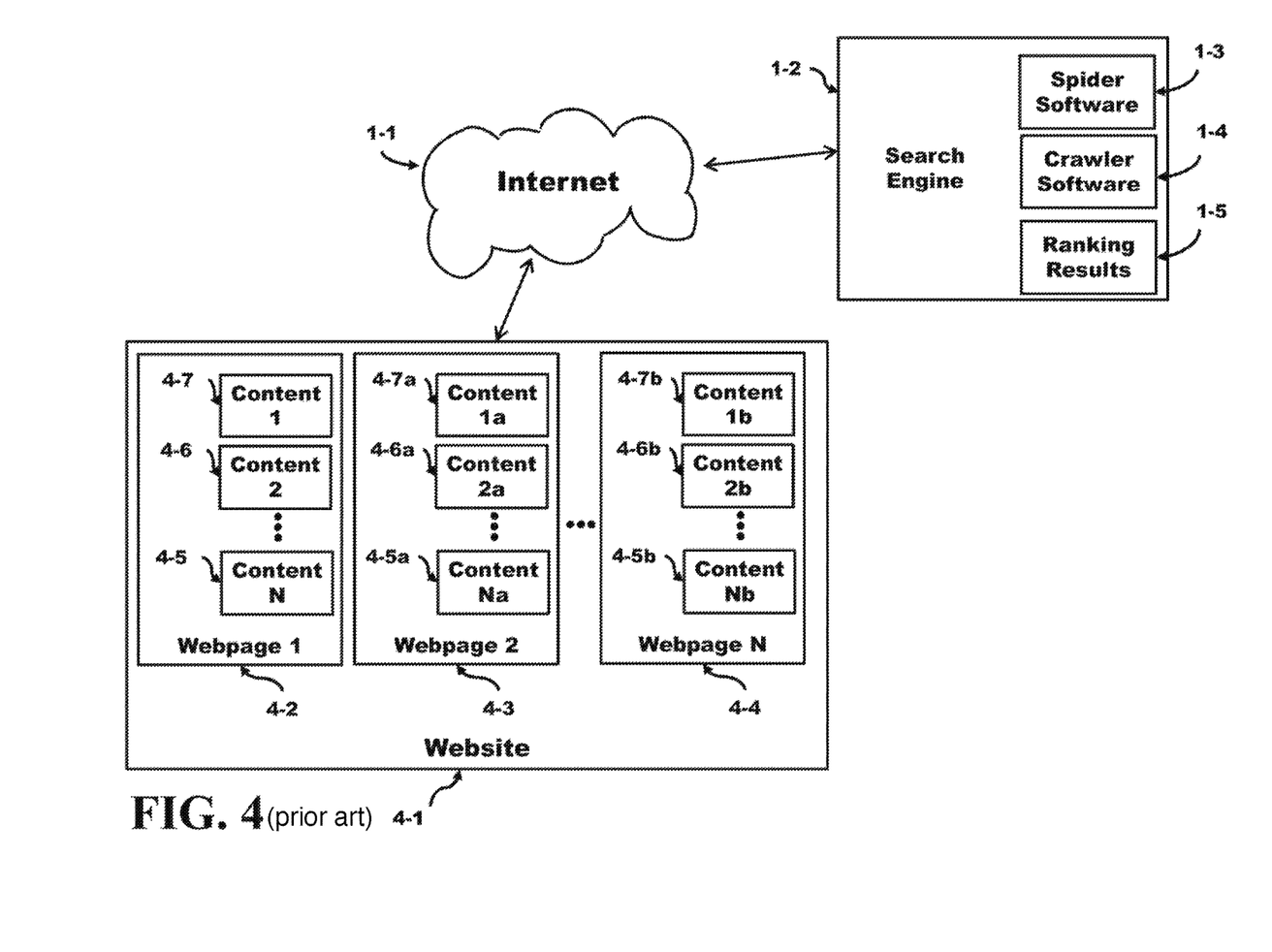
FIG. 4 depicts the search process of a Search Engine using the Internet coupled to a website.

FIG. 4 illustrates the search process of a Search Engine 1-2 searching the Internet 1-1. The Search Engine 1-2 uses its Spider Software 1-3 and Crawler Software 1-4 to search the billions of Websites connected to the Internet 1-1 and the content that they contain, and offer an end user the capability of searching the Internet for content associated to one or more keywords. The Search Engine uses proprietary Ranking Results 1-5 software to "rank" all Websites that are found by the Spider Software 1-3 and Crawler Software 1-4 according to a certain search criteria. A Website 4-1 connected to the Internet 1-1 consists of a plurality of Webpages comprising Webpage 1 4-2, Webpage 2 4-3 to Webpage N 4-4. Each Webpage in such plurality of Webpages contains a plurality of Content. For example, Webpage 1 4-2 contains Content 1 4-7, Content 2 4-6 to Content N 4-5; Webpage 2 4-3 contains Content 1a 4-7a, Content 2a 4-6a to Content Na 4-5a; Webpage 3 4-4 contains Content 1b 4-7b, Content 2b 4-6b to Content Nb 4-5b. The Search Engine 1-2 is able to "find" the Website 4-1, "find" the Content, categorize such Content according to a certain search criteria, and "rank" it relatively to other Content from other Websites for that search criteria. When an end user uses the Search Engine to search for relevant Content with a certain search criteria, the Search Engine is able to provide a list of links to Webpages throughout the Internet 1-1 containing Content relevant, to the desired search criteria. The relevant Content is presented to the end user in a Search Result, which is a list of links to content sorted in terms of "Relevancy" to the desired search criteria. More relevant Content is displayed on top of the list; less relevant Content is displayed on the bottom of the list. Website designers and administrators use certain techniques to emphasize the relevancy of their Content, so it appears at the top of the list in the Search Result. These techniques are called "Search Engine Optimization" techniques.

BRIEF SUMMARY OF INVENTION

A Search Engine is used to "find" the Content contained in the Pages of the Native Mobile Application by matches such Content in a Website, found by the Search Engine and displayed to the end user in a Search Result. An Application is generated consisting of several Application Components. A business entity defines a Service Representation and Business Entity. An Automatic Data Model Generator automatically generates a Data Model. The generated Data Model, an Automatic Application Generator automatically generates all the Application Components. The generated Application Components include a Searchable Application Representation. The Native Mobile Applications comprises a Native Mobile Application executable for each mobile client device. All the Mobile Applications in the set of Native Mobile Applications are identical in terms of features offered to the end user and behavior. All the Mobile Applications in the set of Native Mobile Application contain exactly the same Pages and the same Content.

The Searchable Application Representation is always kept in perfect synchronization with the Native Mobile Applications. Every time a Content Addition, Modification, Deletion occurs, it is applied simultaneously and in an identical fashion to the Searchable Application Representation and the Native Mobile Applications, using the Dynamic Layer Update Flow. Similarly, every time an Internal/External Link Addition, Modification, Deletion occurs, it is applied simultaneously and in an identical fashion to the Searchable Application Representation.

A Searchable Application Representation is available on a website with the exact structure, Content, functionality, and behavior of the Native Mobile Applications and is Searchable By Search Engines. Such Searchable Application Representation can make the Native Mobile Applications "searchable" by Search Engines by providing metadata pointing to the Native Mobile Applications when the Search Engine searches the Searchable Application Representation and the Native Mobile Applications, where the Dynamic Layer Update Flow is used.

The Searchable Application Representation and uses the Search Engine point to search the corresponding Native Mobile Application. The Search Engine searches the Internet. When the Search Engine finds the Searchable Application Representation, Pointer, Metadata and Search Material to Corresponding Native Mobile Application, the results are returned to the Search Engine, making the Search Engine aware of the Native Mobile Application. Once the Search Engine finds the Searchable Application Representation, the Search Engine can search the Content contained in the Searchable Application Representation.

The Search Engine finds and ranks Content in the Searchable Representation and Pointer, Metadata, and Search Material to corresponding to such Content in the Native Mobile Application is passed to the Search Engine, which can use such information to determine the relevancy of such Content according to a certain Search Criteria.

An embodiment of the one of the present inventions is a searchable apparatus comprising: a client device having a processor, a display screen, an operating system, and at least one mobile application with a first structure of a plurality of first pages, wherein the operating system is configured to run the at least one mobile application on the client device; a searchable application representation searched by at least one search engine capable to search in the content of the searchable application representation; and a second structure of a plurality of second pages in the searchable representation where each second page matches each the first page of the at least one mobile application, wherein the first structure matches the second structure. The apparatus further comprising: at least one first content in at least one of the plurality of first pages in the at least one mobile application; and at least one second content in at least one of the plurality of second pages on one of a plurality of websites or one of a plurality of servers, wherein the at least one first content matches the at least one second content. The apparatus further comprising: a business entity configured to modify the first structure, at least one first page, at least one first content, at least one first behavior, or at least one first functionality of the at least one mobile application and generate new versions of the searchable application representation, wherein a perfect match is maintained between the second structure, at least one second page, at least one second content, at least one second behavior, or at least one second functionality of the searchable application representation, respectively, further comprising: an application/representation synchronization engine configured to synchronize additions, modifications, or deletions in an identical fashion to both the searchable application representation and the at least one mobile application. The apparatus wherein the least one search engine finds the searchable application representation, a pointer, a metadata and a search material corresponding to the at least one mobile application and is returned to the at least one search engine, to find and to rank content in the searchable application representation and the pointer, the metadata, or the search material to corresponding content in the at least one mobile application. The apparatus further comprising: an application store coupled to the client device via an Internet.

Another embodiment of the one of the present inventions is a method of a searchable application representation comprising the steps of searching the searchable application representation by at least one search engine capable to search in a content of the searchable application representation, wherein a client device having a processor, a display screen, and an operating system that is configured to run at least one mobile application with a first structure of a plurality of first pages on the client device, and having a second structure in a plurality of second pages of the searchable application representation where each second page matches each the first page of the at least one mobile application, wherein the first structure matches the second structure. The process further comprising the steps of: creating at least one first content in at least one of the plurality of first pages on the at least one mobile application; and creating at least one second content in at least one of the plurality of second pages on one of a plurality of websites or one of a plurality of servers, wherein the at least one first content matches the at least one second content. The process further comprising the steps of: modifying by a business entity the first structure, at least one first page, at least one first content, at least one first behavior, or at least one first functionality of the at least one mobile application and generate new versions of the searchable application representation, wherein a perfect match is maintained between the second structure, at least one second page, at least one second content, at least one second behavior, or at least one second functionality of the searchable application representation, respectively, further comprising the steps of: synchronizing additions, modifications, or deletions by an application/representation synchronization engine, wherein the synchronization is applied in an identical fashion to the searchable application representation and the at least one mobile application. The process wherein the at least one search engine finds the searchable application representation, a pointer, a metadata and a search material corresponding to the at least one mobile application and is returned to the search engine, to find and to rank content in the searchable application representation and the pointer, the metadata, or the search material to corresponding content in the at least one mobile application. The process further comprising the steps of: coupling an application store to the client device via an Internet.

Another embodiment of the one of the present inventions is a searchable apparatus comprising: a client device having a processor, a display screen, an operating system, and at least one mobile application, wherein the operating system is configured to run the at least one mobile application on the client device; a searchable application representation searched by at least one search engine capable to search in a content of the searchable application representation; and a first structure in the searchable application representation where the first structure matches a second structure in the at least one mobile application, further comprising: at least one first content in at least one of the plurality of first pages in the at least one mobile application; and at least one second content in at least one of the plurality of second pages on one of a plurality of websites or one of a plurality of servers, wherein the at least one first content matches the at least one second content, further comprising: a business entity configured to modify the first structure, at least one first page, at least one first content, at least one first behavior, or at least one first functionality of the at least one mobile application and generate new versions of the searchable application representation, wherein a perfect match is maintained between the second structure, at least one second page, at least one second content, at least one second behavior, or at least one second functionality of the searchable application representation, respectively, further comprising: an application/representation synchronization engine configured to synchronize additions, modifications, or deletions in an identical fashion to both the searchable application representation and the at least one mobile application. The apparatus wherein the at least one search engine finds the searchable application representation, a pointer, a metadata and a search material corresponding to the at least one mobile application and is returned to the search engine, to find and to rank content in the searchable application representation and the pointer, the metadata, or the search material to corresponding content in the at least mobile application. The apparatus further comprising: an application store coupled to the client device via an Internet.

DETAILED DESCRIPTION OF THE INVENTION

Figure 5:
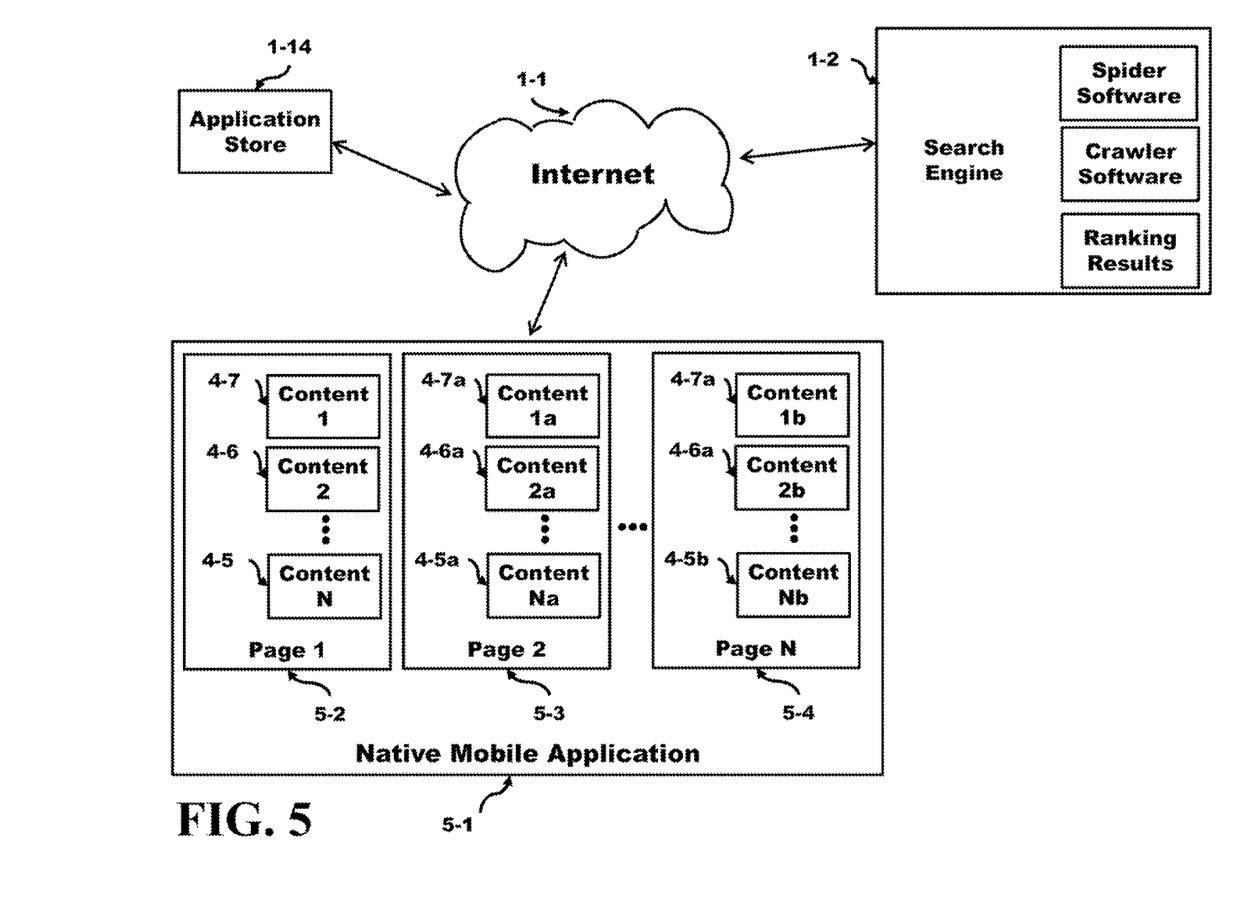
FIG. 5 shows the structure of a Native Mobile Application consisting of a plurality of Pages where each Page in such plurality of Pages contains a plurality of Content where the search process of a Search Engine using the Internet coupled to the Native Mobile Application in accordance with an embodiment of the one of the present inventions.

FIG. 5 shows the structure of a Native Mobile Application. A Mobile Application 5-1 consists of a plurality of Pages comprising Page 1 5-2, Page 2 5-3 to Page N 5-4. Each Page in such plurality of Pages contains a plurality of Content. For example, Page 1 5-2 contains Content 1 4-7, Content 2 4-6 to Content N 4-5; Page 2 5-3 contains Content 1a 4-7a, Content 2a 4-6a to Content Na 4-5a; Page 3 5-4 contains Content 1b 4-7b, Content 2b 4-6b to Content Nb 4-5b. The Native Mobile Application 5-1 has a very similar structure to the Website 4-1 and also contains Content. However, the Search Engine is not capable of "finding" the Native Mobile Application 5-1 and is not capable of "finding" the Content contained in the Pages of the Native Mobile Application. For a first Content, if such first Content is contained in a Website, it is found by the Search Engine and is displayed to the end user in a Search Result. If such first Content is contained in a Native Mobile Application, it is not found by the Search Engine and is not displayed to the end user in any Search Result.

Figure 6:
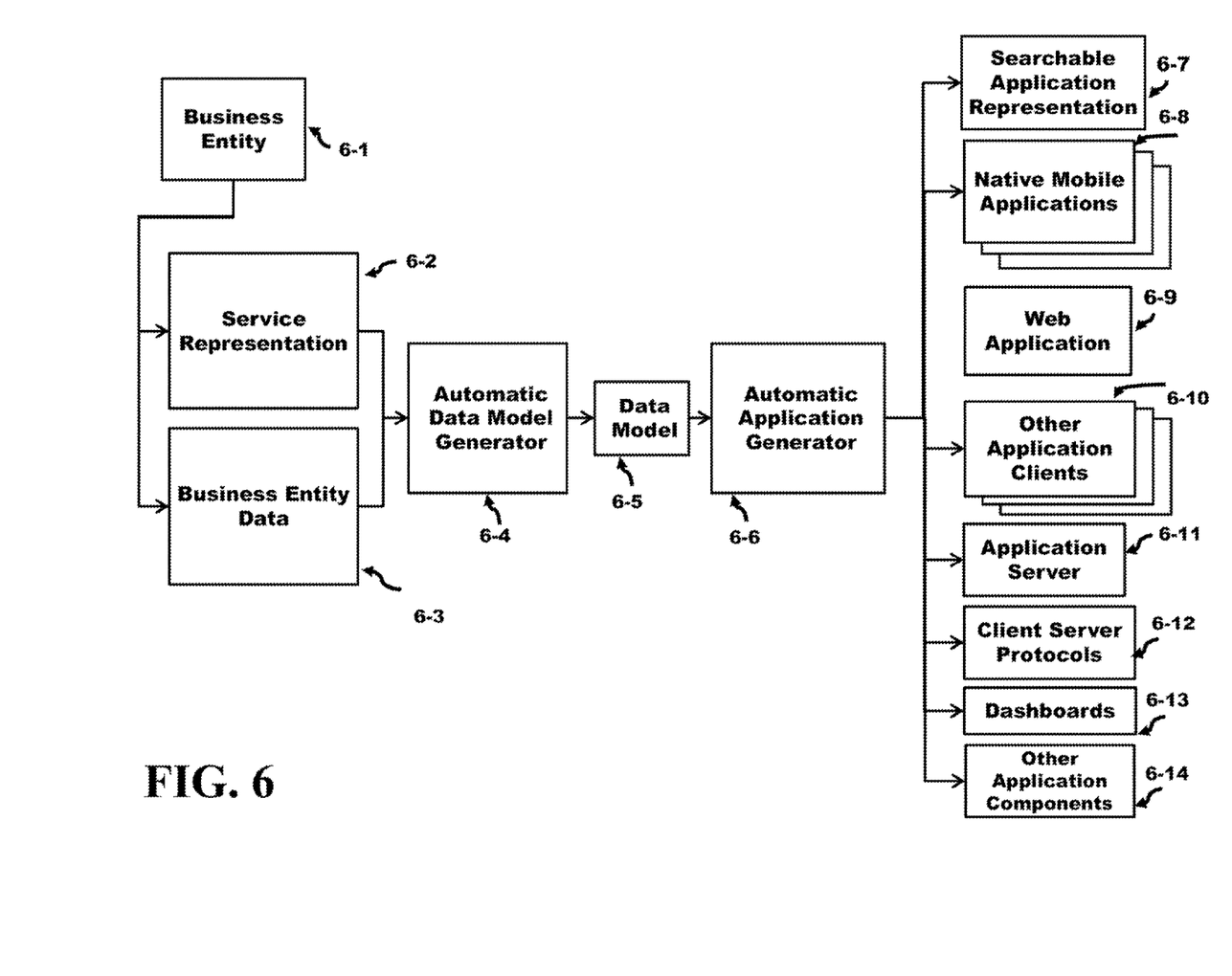
FIG. 6 presents a method and apparatus to automatically generate an Application consisting of several Application Components in accordance with an embodiment of the one of the present inventions.

FIG. 6 depicts a method and apparatus to automatically generate an Application consisting of several Application Components. A business entity 6-1 defines a Service Representation 6-2 and Business Entity Data 6-3. An Automatic Data Model Generator 6-4 takes the Service Representation 6-2 and the Business Entity Data 6-3 as inputs and automatically generates a Data Model 6-5. Using the generated Data Model 6-4, an Automatic Application Generator 6-6 automatically generates all the Application Components. The generated Application Components include a Searchable Application Representation 6-7, a plurality of Native Mobile Applications 6-8, one per mobile platform, a Web Application 6-9, Other Application Clients 6-10, an Application Server 6-11, Client Server Protocols 6-12, Dashboards 6-13, and Other Components 6-14. The set of Native Mobile Applications 6-8 comprises a Native Mobile Application executable for each mobile client device that the Native Mobile Application is desired to run on. All the Mobile Applications in the set of Native Mobile Applications 6-8 are identical in terms of features offered to the end user and behavior. All the Mobile Applications in the set of Native Mobile Application 6-8 contain exactly the same Pages and the same Content. What is relevant in this application is that such method is capable of generating a Searchable Application Representation 6-7 that has exactly the same structure and behavior of the Native Mobile Applications 6-8.

The Searchable Application Representation 6-7 runs on the Web in exactly the same fashion as a Website 4-1. For each Page comprised in the Native Mobile Applications 6-8, there is a corresponding Webpage in the Searchable Application Representation 6-7. For each piece of Content contained in the Native Mobile Applications 6-8, there is a corresponding and identical piece of Content contained in the Searchable Application Representation 6-7. For each link contained in the Native Mobile Applications 6-8, there is a corresponding link of identical behavior in the Searchable Application Representation 6-7. The Searchable Application Representation 6-7 runs on a Website 4-1, and is therefore searchable by the Search Engine 1-2. The Content in the Searchable Application Representation is also searchable by the Search Engine 1-2, since it runs on a Website. The Searchable Application Representation contains metadata that is read by the Search Engine 1-2 when it searches the Searchable Application Representation 6-7. Such metadata provides links and search material to the Native Mobile Applications 6-8 that correspond to the Searchable Application Representation 6-7.

Figure 7:
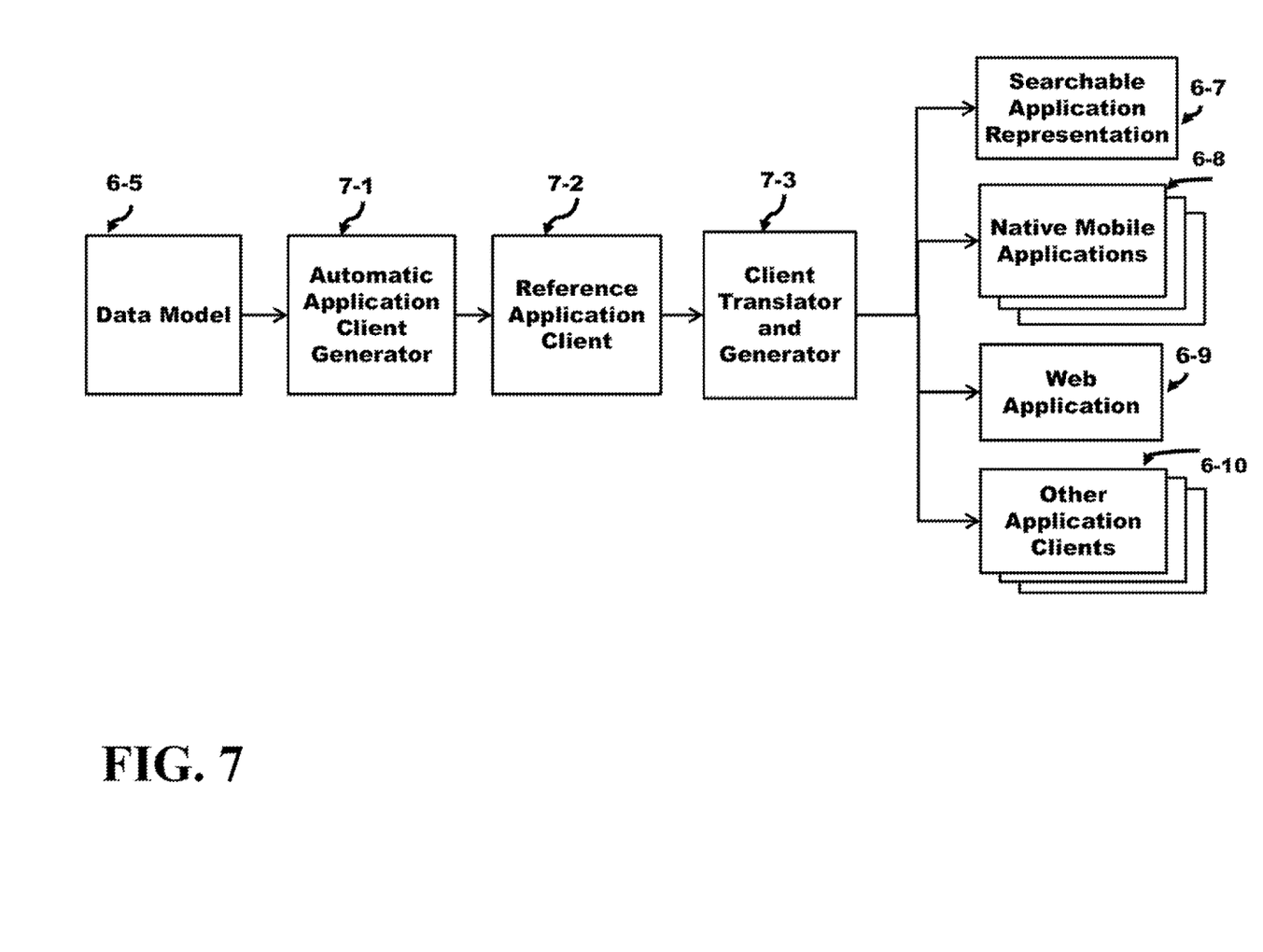
FIG. 7 depicts further detail of the Automatic Client Generation process, which is part of the method and apparatus depicted in FIG. 6 from the Data Model, the Automatic Application Client Generator in accordance with an embodiment of the one of the present inventions.

FIG. 7 provides further detail of the Automatic Client Generation process, which is part of the method and apparatus depicted in FIG. 6 from the Data Model 6-5, the Automatic Application Client Generator 7-1, which is part of the Automatic Application Generator 6-6, first automatically venerates a Reference Application Client 7-2. Once the Reference Application Client 7-2 is generated, the Client Translator and Generator 7-3 generates the Searchable Application Representation 6-7, the set of Native Mobile Applications 6-8, the Web Application 6-9, and the Other Application Clients 6-10. The Searchable Application Representation 6-7 and all the other Native Mobile Applications 6-8, the Web Application 6-9, and the Other Application Clients 6-10 have exactly the same structure in terms of Pages, contain exactly the same Content on each Page, and offers exactly the same behavior and functionality to the end user.

Figure 8:
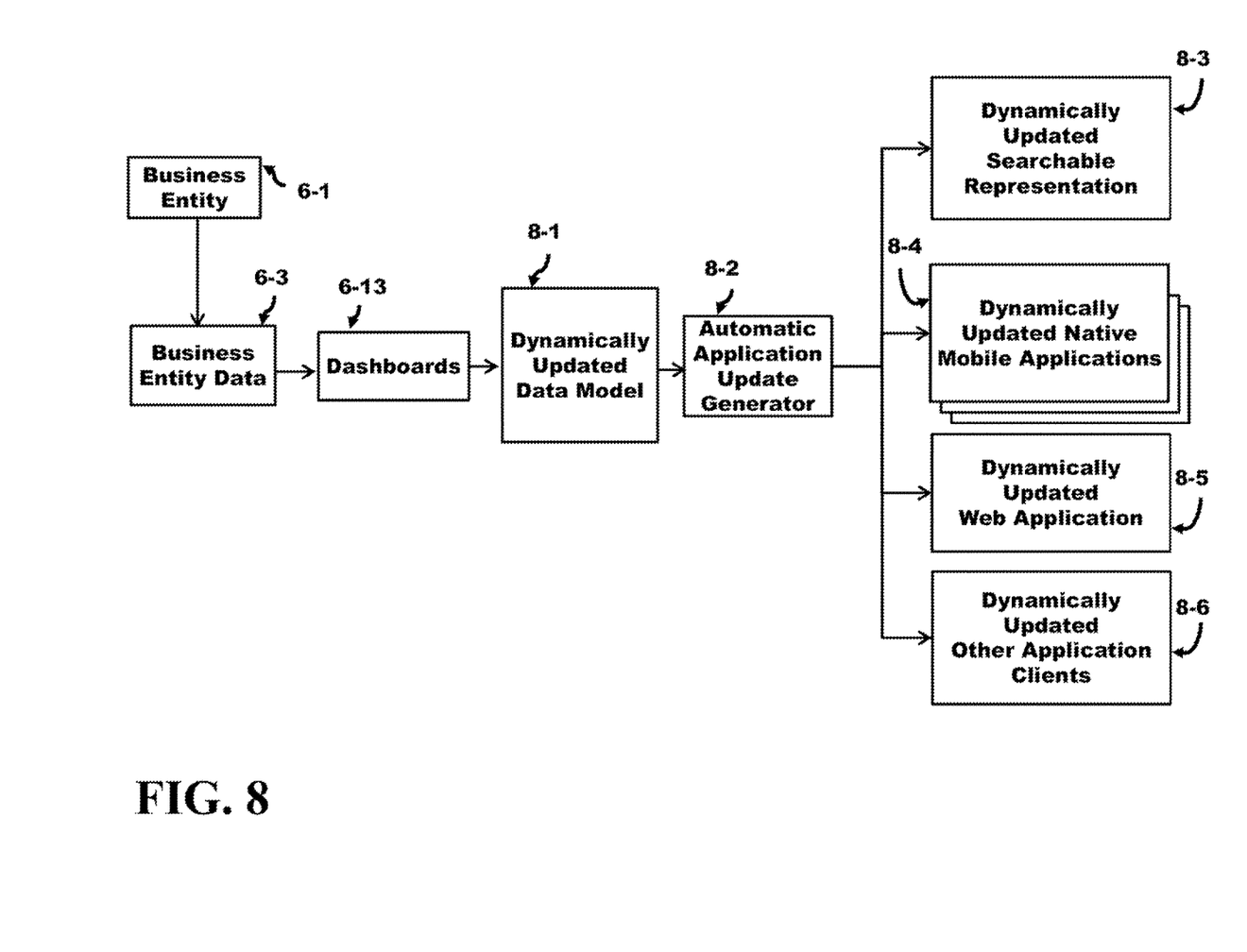
FIG. 8 presents a Dynamic Layer Update flow which shows how the newly created Searchable Application Representation and all the other Native Mobile Applications, the Web Application, and the Other Application Clients can be modified by the Business Entity simultaneously and automatically using the newly created Dashboards by modifying the Business Entity Data in accordance with an embodiment of the one of the present inventions.

FIG. 8 presents a Dynamic Layer Update flow which shows how the newly created Searchable Application Representation 6-7 and all the other Native Mobile Applications 6-8, the Web Application 6-9, and the Other Application Clients 6-10 can be modified by the Business Entity 6-1 simultaneously and automatically using the newly created Dashboards 6-13 by modifying the Business Entity Data 6-3. The System Solution allows the business entity 6-1 to modify the Data Model 6-5 and generate new versions of the Searchable Application Representation 6-7 and all the other Native Mobile Applications 6-8, Web Application 6-9, and Other Application Clients 6-10. The Business Entity 6-1 using the Dashboards 6-13 generates the Dynamically Updated Data Model 8-1 which is then applied to the Automatic Application Update Generator 8-2 which is a sub-set of the Automatic Application Generator 6-6. The output of the Automatic Application Update Generator 8-2 generates the Dynamically Updated Searchable Application Representation 8-3, the Dynamically Updated Native Mobile Applications 8-4, the Dynamically Updated Web Application 8-5, and the Dynamically Updated Other Application Clients 8-6.

Once this sequence has been established, the Business Entity can manipulate the business data applied to the Dashboards 6-13 and can continuously and automatically maintain a perfect matching, of the structure, content, behavior, and functionality of the Searchable Application Representation 6-7 and the Native Mobile Applications 6-8.

Figure 9:
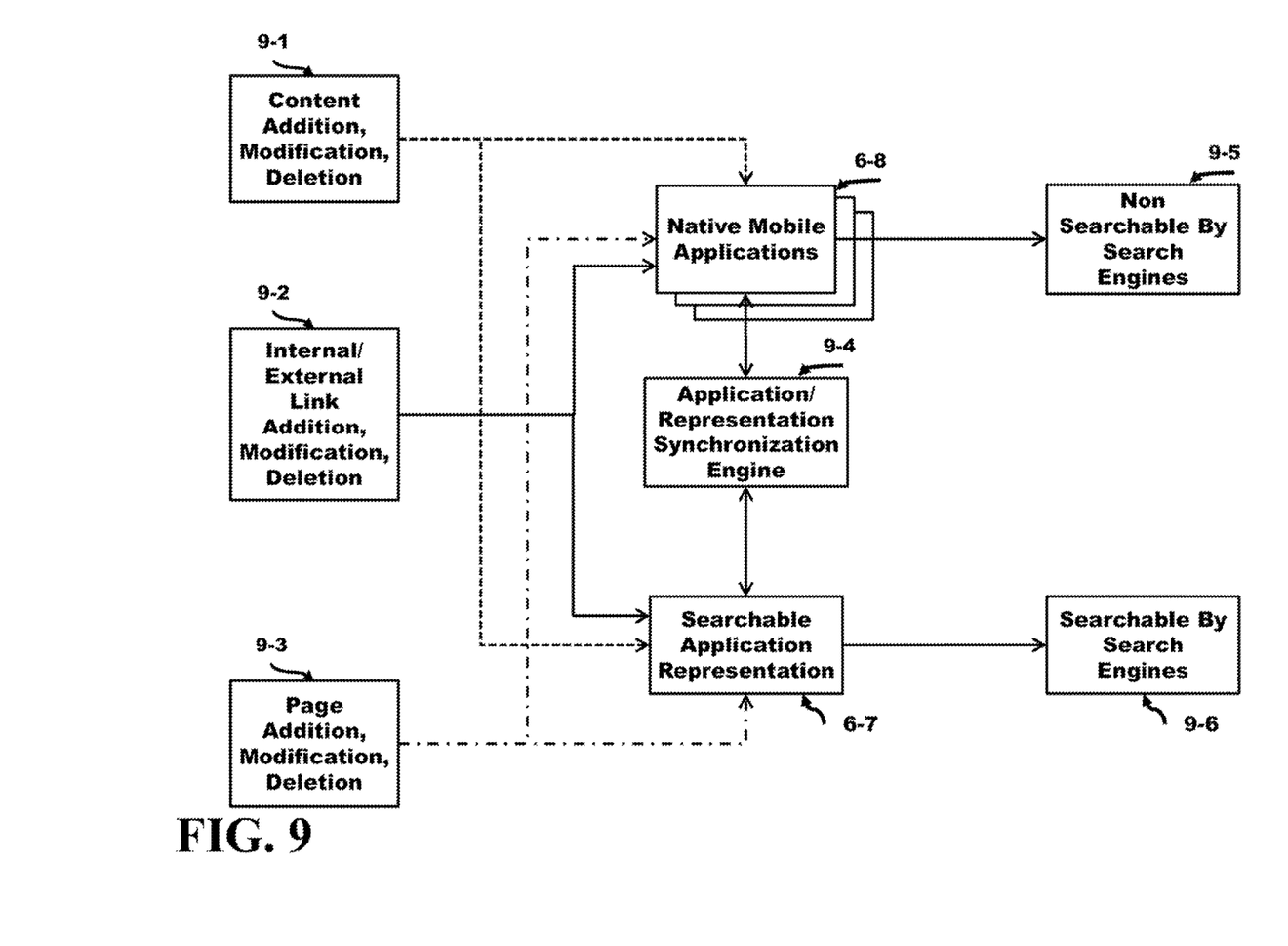
FIG. 9 depicts additional details on how the Searchable Application Representation is always kept in perfect synchronization with the Native Mobile Applications in accordance with an embodiment of the one of the present inventions.

FIG. 9 provides additional details on how the Searchable Application Representation 6-7 is always kept in perfect synchronization with the Native Mobile Applications 6-8. Every time a Content Addition, Modification, Deletion 9-1 occurs, it is applied simultaneously and in an identical fashion to the Searchable Application Representation 6-7 and the Native Mobile Applications 6-8, using the Dynamic Layer Update Flow explained in FIG. 8. Similarly, every time an Internal/External Link Addition, Modification, Deletion 9-2 occurs, it is applied simultaneously and in an identical fashion to the Searchable Application Representation 6-7 and the Native Mobile Applications 6-8, using the Dynamic Layer Update Flow explained in FIG. 8. Also, every time a Page Addition, Modification, Deletion 9-3 occurs, it is applied simultaneously and in an identical fashion to the Searchable Application Representation 6-7 and the Native Mobile Applications 6-8, using the Dynamic Layer Update Flow explained in FIG. 8. Furthermore, an Application/Representation Synchronization Engine 9-4 verifies that the additions, modifications, deletions, are applied in an identical fashion to the Searchable Application Representation 6-7 and the Native Mobile Applications 6-8. The result of this sequence is that the Native Mobile Applications 6-8 are Non Searchable By Search Engines 9-5, but a Searchable Application Representation 6-7 with the exact structure, Content, functionality, and behavior of the Native Mobile Applications 6-8 is Searchable By Search Engines 9-6. Such Searchable Application Representation 6-7 can make the Native Mobile Applications 6-8 "searchable" by Search Engines by providing metadata pointing to the Native Mobile Applications 6-8 when the Search Engine 1-2 searches the Searchable Application Representation.

Figure 10:
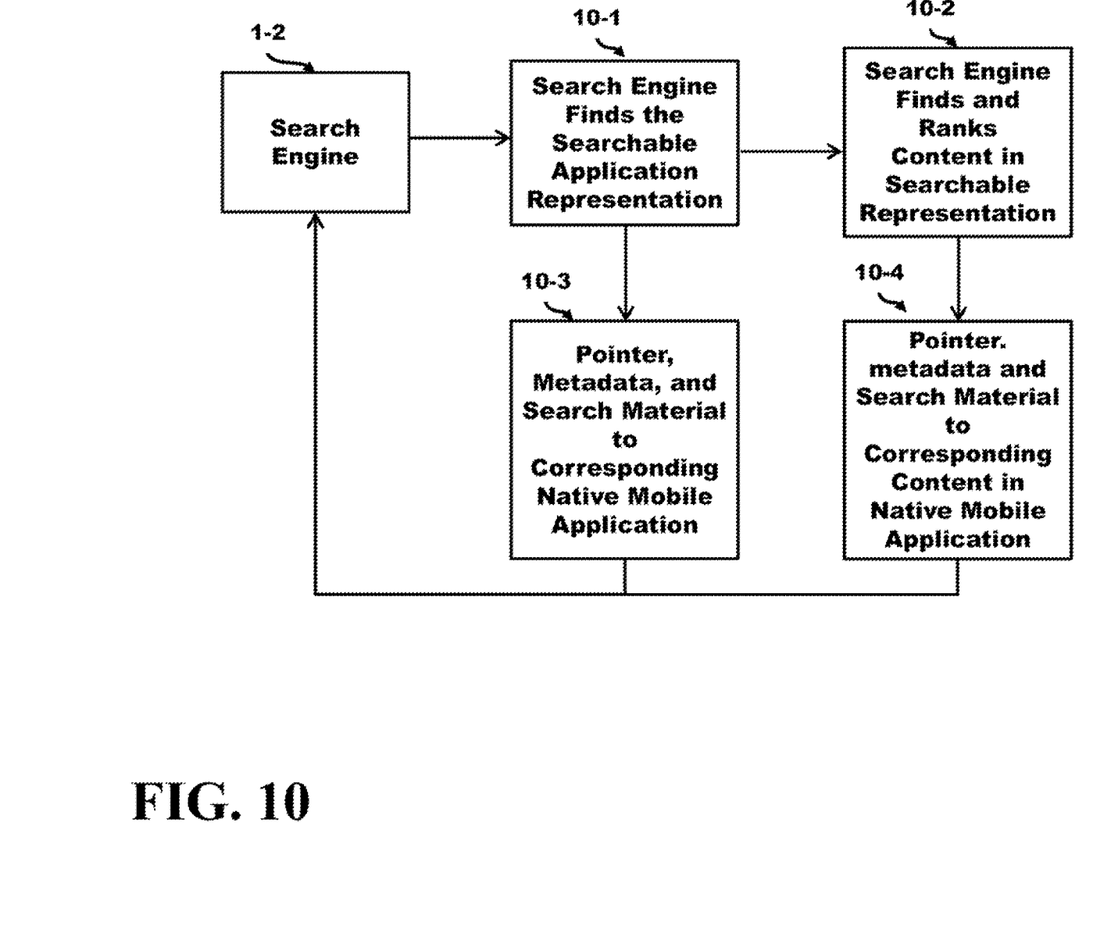
FIG. 10 illustrates the process of searching the Searchable Application Representation and making the Search Engine point to the corresponding Native Mobile Application in accordance with an embodiment of the one of the present inventions.

FIG. 10 illustrates the process of searching the Searchable Application Representation 6-7 and making the Search Engine point to the corresponding Native Mobile Application. The Search Engine 1-2 searches the Internet 1-1. When the Search Engine Finds the Searchable Application Representation 10-1, Pointer, Metadata and Search Material to Corresponding Native Mobile Application 10-3 is returned to the Search Engine 1-2, making the Search Engine aware of the Native Mobile Application. Once the Search Engine 1-2 finds the Searchable Application Representation, the Search Engine 1-2 can search the Content contained in the Searchable Application Representation, which is identical to the Content contained in the corresponding Native Mobile Application, except for additional metadata pointing to the Corresponding Native Mobile Application. The Search Engine Finds and Ranks Content in Searchable Representation 10-2 and Pointer, Metadata, and Search Material to Corresponding Content in Native Mobile Application 10-4 is passed to the Search Engine, which can use such information to determine the relevancy of such Content according to a certain Search Criteria.

What is claimed is:

1. A searchable apparatus comprising:
a processor configured to generate a non-native searchable application representation of a native mobile application, the native mobile application being executable by a client device and having a plurality of first pages comprising a first structure of the non-native searchable application representation having a plurality of second pages comprising a second structure, each of the plurality of second pages of the non-native searchable application representation corresponding to a respective one of the plurality of first pages of the native mobile application, wherein the first structure is exactly the same as the second structure; and
a server configured to provide the non-native searchable application representation as a website such that content and functionality of the plurality of first pages of the native mobile application is configured to be searched by a search engine when the search engine provides links to the website comprising the plurality of second pages of the non-native searchable application representation.

2. The apparatus of claim 1, wherein the plurality of first pages further comprise a first functionality and a first behavior and the plurality of second pages comprise a second functionality and a second behavior, wherein the first functionality and the first behavior is exactly the same as the second functionality and the second behavior.

3. The apparatus of claim 1,
wherein the plurality of first pages comprises first content;
wherein the plurality of second pages comprises second content; and
wherein the first content is exactly the same as the second content.

4. The apparatus of claim 1, further comprising:
wherein, when at least one first page, at least one first content, at least one first behavior, or at least one first functionality of the native mobile application is modified, a new version of the non-native searchable application representation is generated.

5. The apparatus of claim 4, further comprising:
an application/representation synchronization engine configured to synchronize additions, modifications, and/or deletions to both the searchable application representation and the native mobile application.

6. The apparatus of claim 1, wherein the plurality of second pages of the non-native searchable application representation comprise metadata that causes the search engine to associate the non-native searchable application representation with the native mobile application.

7. A method for making mobile application content available to search engines, the method comprising:
generating a non-native searchable application representation of a native mobile application, the native mobile application being executable by a client device and having a plurality of first pages comprising a first structure, the non-native searchable application representation having a plurality of second pages comprising a second structure, each of the plurality of second pages of the non-native searchable application representation corresponding to a respective one of the plurality of first pages of the native mobile application, wherein the first structure is exactly the same as the second structure; and
providing the non-native searchable application representation as a website such that content and functionality of the plurality of first pages of the native mobile application is configured to be searched by a search engine when the search engine provides links to the website comprising the plurality of second pages of the non-native searchable application representation.

8. The method of claim 7, wherein the plurality of first pages further comprise a first functionality and a first behavior and the plurality of second pages comprise a second functionality and a second behavior, wherein the first functionality and the first behavior is exactly the same as the second functionality and the second behavior.

9. The method of claim 7,
wherein the plurality of first pages comprises first content;
wherein the plurality of second pages comprises second content; and
wherein the first content is exactly the same as the second content.

10. The method of claim 7, further comprising the steps of:
wherein, when at least one first content, at least one first behavior, or at least one first functionality of the native mobile application is modified, a new version of the non-native searchable application representation is generated.

11. The method of claim 10, further comprising:
synchronizing additions, modifications, and/or deletions to the non-native searchable application representation and the native mobile application.

12. The method of claim 7, wherein the plurality of second pages of the non-native searchable application representation comprise metadata that causes the search engine to associate the non-native searchable application representation with the native mobile application.

* * * * *